(12) United States Patent
Matsui

(10) Patent No.: US 7,821,901 B2
(45) Date of Patent: Oct. 26, 2010

(54) OPTICAL PICKUP DEVICE FOR SUPPORTING A PLURALITY OF TYPES OF OPTICAL DISKS

(75) Inventor: Tsutomu Matsui, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1407 days.

(21) Appl. No.: 10/872,406

(22) Filed: Jun. 22, 2004

(65) Prior Publication Data

US 2004/0264316 A1 Dec. 30, 2004

(30) Foreign Application Priority Data

Jun. 25, 2003 (JP) .......................... P.2003-180686

(51) Int. Cl.
G11B 7/13 (2006.01)

(52) U.S. Cl. ................ 369/112.04; 369/44.41

(58) Field of Classification Search .............. 369/44.11, 369/44.37, 112.05, 44.41, 112.03, 112.04, 369/124.12
See application file for complete search history.

(56) References Cited

U.S. PATENT DOCUMENTS

| | | | | |
|---|---|---|---|---|
| 5,073,888 A | * | 12/1991 | Takahashi et al. | 369/112.17 |
| 5,736,733 A | * | 4/1998 | Shima et al. | 250/208.2 |
| 5,777,973 A | * | 7/1998 | Yoo et al. | 369/112.06 |
| 6,366,543 B2 | * | 4/2002 | Uemura et al. | 369/44.29 |
| 6,483,787 B1 | * | 11/2002 | Sugasawa et al. | 369/44.13 |
| 6,507,009 B1 | * | 1/2003 | Ohnishi et al. | 250/201.2 |
| 6,757,224 B2 | * | 6/2004 | Fukakusa et al. | 369/44.12 |
| 6,868,055 B2 | * | 3/2005 | Ueyama et al. | 369/112.15 |
| 6,930,976 B2 | * | 8/2005 | Ogata | 369/275.3 |
| 7,145,859 B2 | * | 12/2006 | Park et al. | 369/112.05 |
| 7,215,609 B2 | * | 5/2007 | Shimano et al. | 369/44.37 |
| 2001/0026525 A1 | * | 10/2001 | Takahashi | 369/120 |
| 2002/0021652 A1 | * | 2/2002 | Takasuka et al. | 369/112.24 |
| 2002/0114229 A1 | * | 8/2002 | Nishi | 369/44.23 |
| 2003/0107980 A1 | * | 6/2003 | Shih et al. | 369/112.17 |
| 2003/0227858 A1 | * | 12/2003 | Komma | 369/112.08 |
| 2004/0156302 A1 | * | 8/2004 | Nakata et al. | 369/112.17 |
| 2004/0246834 A1 | * | 12/2004 | Seong | 369/44.37 |

FOREIGN PATENT DOCUMENTS

| | | |
|---|---|---|
| JP | 9-288837 | 11/1997 |
| JP | 2001-209957 | 8/2001 |
| JP | 2002-123969 | 4/2002 |
| JP | 2002-245660 | 8/2002 |
| JP | 2003-91865 | 3/2003 |

* cited by examiner

*Primary Examiner*—Wayne R Young
*Assistant Examiner*—Thomas D Alunkal
(74) *Attorney, Agent, or Firm*—Morgan, Lewis & Bockius LLP

(57) ABSTRACT

The optical pickup device includes a semiconductor laser for emitting laser light of 650 nm and 780 nm in wavelengths, a semiconductor laser for emitting laser light of 400 nm in wavelength, and an optical sensor which is provided in sequence with a first light receiving surface divided into four areas in a matrix manner, a second light receiving surface divided into four areas in a matrix manner, and a third light receiving surface divided at least into two areas aligned inline. Reflected light of three beams of 400 nm in wavelength and reflected light of three beams in 780 nm in wavelength are received on the first to third light receiving surfaces respectively, and a main beam of reflected light of 650 nm in wavelength is received on the first light receiving surface on one side out of the three light receiving surfaces.

1 Claim, 2 Drawing Sheets

OPTICAL PICKUP DEVICE FOR SUPPORTING A PLURALITY OF TYPES OF OPTICAL DISKS

BACKGROUND OF THE INVENTION

1. Field of the Invention

The present invention relates to an optical pickup device for irradiating laser light on a recording surface of an optical disk to perform recording and reproduction of information, and to a technology effective to be used in a disk drive which supports a plurality of types of optical disks.

2. Description of the Related Art

At present, a plurality of types of optical disks such as CDs (compact disk), DVDs (Digital Versatile Disk), or blue-violet laser optical disks having a capacity which is several times as much as the DVD have come into practical use. When performing recording or reproduction of information on the plurality of types of optical disks as such, it is necessary to employ laser light different in wavelength or objective lenses of different apertures depending on media type.

In the related art, there is a disk drive which supports a plurality of optical disks including optical pickups of two systems and moving mechanisms of two systems for moving the optical pickups of these two systems separately in the direction of the radius of the disk. However, in this configuration, there arises a problem in that the structure of the device as a whole is upsized, and a cost increases as well.

There is another technology disclosed in JP-A-2002-123969 as a technology in the related art which can support a plurality of optical disks with a single optical pickup. According to this technology, a single optical pickup includes two semiconductor lasers each emitting laser light of three wavelengths and the two objective lenses having different apertures, which are switched for use.

In the optical pickup, it is necessary to drive the objective lens, which opposes to the optical disk, in the focusing direction and the tracking direction, and perform servo-control so that laser light is not displaced from an objective data track. In the device disclosed in JP-A-2002-123969, a plurality of sets of light receiving surface groups are provided in an optical sensor so as to support the laser light of different wavelength respectively, the laser light of the respective wavelengths are detected on the light receiving surface groups corresponding to the respective wavelengths, and a focus error signal or a tracking error signal required for the above-described servo-control are generated based on the result of detection.

However, in the technology of JP-A-2002-123969, since the plurality of sets of light receiving surface groups are provided in the optical sensor so as to support the laser light of respective wavelengths, there arises a problem in that the cost of the optical sensor increases.

SUMMARY OF THE INVENTION

It is an object of the present invention to enable configuration of an optical pickup device which can record or reproduce information on a plurality of types of optical disks by switching the laser light of a plurality of wavelength for use in a simple structure at a low cost.

In order to achieve the object described above, the present invention is an optical pickup device for performing recording or reproduction of information with respect to a plurality of types of optical disks by switchably irradiating three types of laser light having a different wavelength on a recording surface of the optical disk, including a first laser emitter for emitting one of the three types of laser light, a second laser emitter including two types of laser diodes of different wavelength being packaged into a single unit for emitting remaining two types of laser light out of the three types of laser light, one or more of diffraction gratings for dividing the laser light emitted from the first and second laser emitters into a plurality of beams, an optical system for guiding the laser light from the first laser emitter and the second laser emitter to the recording surface of the optical disk and guiding reflected light from the optical disk along the predetermined route, a beam splitter for splitting the laser light proceeding toward the optical disk and the reflected light from the optical disk, and an optical sensor for receiving the reflected light split by the beam splitter, wherein the optical sensor includes in sequence a first light receiving surface divided into four areas in a matrix manner, a second light receiving surface divided into four areas in a matrix manner, and a third light receiving surface divided into at least two areas aligned in line, wherein the three-beam reflected light emitted from the first laser emitter and divided and the three-beam reflected light of one of the wavelengths emitted from the second laser emitter and divided enter the first to third light receiving surfaces respectively, and a main beam of the reflected light of the other wavelength emitted from the second laser emitter enters the first receiving surface.

In this arrangement, the laser light of three wavelengths can be switched for use by a single optical pickup device, whereby supporting a plurality of optical disks. In addition, in a case where the laser light of three wavelengths are used respectively, the optical detection for generating the tracking error signal can be performed by the optical sensor having at least three light receiving surfaces which are divided into ten areas.

Accordingly, by being loaded on the disk drive which supports the CDs, DVDs, and blue-violet laser optical disks, the structure of the disk drive can be simplified and downsized, and at the same time, the cost of the components of the optical pickup device, especially of the optical sensor can be reduced.

The second laser emitter may include a semiconductor laser in which two types of laser diodes emitting different wavelengths are packaged in one unit. The semiconductor laser may be a hybrid-type semiconductor laser in which two semiconductor chips each formed with a laser diode are packaged in one single unit, or may be a monolithic semiconductor laser in which two types of laser diodes are formed on one semiconductor chip and packaged in one single unit.

With such a semiconductor laser, the laser light of two wavelengths may be emitted from two light emitting points slightly apart from each other, for example, 100 m, the distance can be control easily. Therefore, the laser light of the respective wavelengths can be detected on the three light receiving surfaces by coordinating the distance between these two light emitting points and the direction of alignment thereof with the distances among the three light receiving surfaces of the optical sensor and the direction of alignment thereof, as described above.

More specifically, the tracking error signal may be generated by the differential push-pull method based on the result of detection of the reflected light of laser light emitted from the first laser emitter onto the first to third light receiving surfaces, the tracking error signal may be generated by a three-beam method based on the result of detection of the reflected light of one of the wavelengths emitted from the second laser emitter onto the first to third light receiving surfaces, and the tracking error signal may be generated by the phase difference detecting method based on the result of detection of the reflected light of the other wavelength emitted from the second laser emitter onto the first light receiving surface.

Preferably, in order to prevent the reflected light from entering the laser emitter, which may induce external resonance of laser, the optical system is provided with a quarter wave plate which functions as an optical isolator in cooperation with the beam splitter. However, when it is difficult to provide the wave plate which supports the laser light of three wavelengths, a configuration in which the wave plates are switched when the laser light to be used is switched may be employed.

In the case of the optical pickup device having a structure in which a plurality of objective lenses are switched according to the wavelength, a configuration in which the wave plate is mounted to an position switching mechanism for the objective lens so that the wavelengths can also be switched in association with switching of the objective lenses may be employed. In comparison with the case in which switching of the wave plate independently, the configuration of the entire device can be simplified and simultaneously, the cost may be reduced.

BRIEF DESCRIPTION OF THE DRAWINGS

These and other objects and advantages of this invention will become more fully apparent from the following detailed description taken with the accompanying drawings in which:

FIG. 4A is a first example, and FIG. 4B is a second example.

DETAILED DESCRIPTION OF THE PREFERRED EMBODIMENTS

Figure 1:
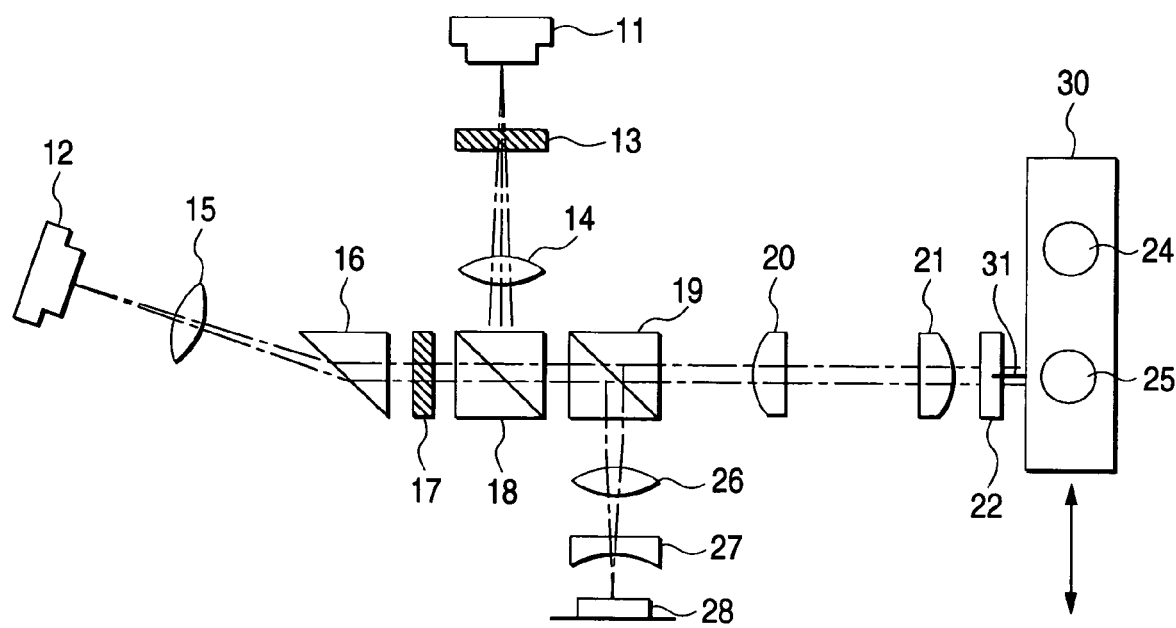
FIG. 1 is a block diagram showing an optical system of an optical pickup device according to an embodiment of the present invention.

Referring now to the drawings, an embodiment of the present invention will be described.

Figure 2:
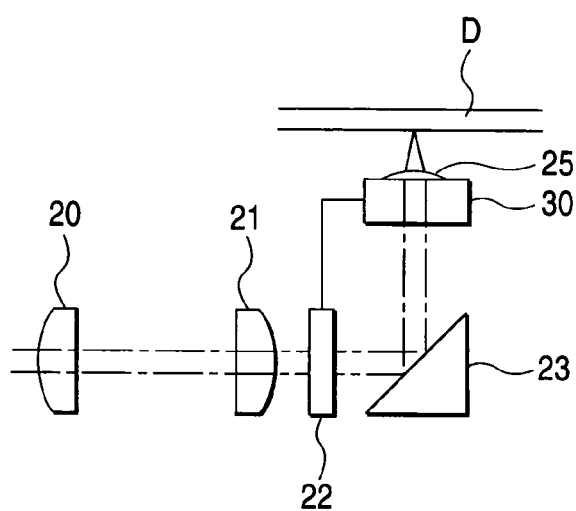
FIG. 2 is a side view showing a configuration between expander lenses to an objective lens.

FIG. 1 is a block diagram showing an optical system of an optical pickup device according to an embodiment of the present invention, and FIG. 2 is a side view showing a configuration from expander lenses to an objective lens in FIG. 1.

The optical pickup in this embodiment enables recording and reproduction of information on a plurality of types of optical disk such as CDs, DVDs, and blue-violet laser optical disks by switching laser light of three wavelengths, for example, of 405 nm (hereinafter called 400 nm), 658 nm (hereinafter called 650 nm), and 785 nm (hereinafter called 780 nm), and the objective lenses of apertures of "NA=0.65" and "NA=0.84" for use.

As shown in FIG. 1, the configuration of an optical system of the optical pickup includes a two-wavelength packaged semiconductor laser 11 for emitting laser light of two wavelengths of 650 nm and 780 nm, a semiconductor laser 12 for emitting a laser light of 400 nm, a diffraction grating 13 for separating the laser light of the semiconductor laser 11 into three beams, a collimator lens 14 for converting the laser light into a parallel ray, a collimator lens 15 for converting the laser light from the semiconductor laser 12 into a parallel ray, a prism 16 for correcting the shape of a light spot from oval to circle by providing aberration to the laser light, a diffraction grating 17 for separating the laser light into three beams, a half mirror 18 for aligning the routes of the respective laser light emitted from the two semiconductor lasers 11, 12 onto the identical line, a beam splitter 19 for splitting the laser light proceeding toward the optical disk and the reflected light from the optical disk, expander lenses 20, 21 for scaling the beam, a quarter wave plate 22 which serves as the optical isolator in cooperation with the beam splitter 19, a upright mirror 23 (FIG. 2) orienting the horizontal beam into the vertical direction, two objective lenses 24, 25 for focusing the laser light onto the recording surface of an optical disk D, a collimator lens 26 for focusing the reflected light split by the beam splitter 19, a cylindrical lens 27 for providing astigmatism in the predetermined direction to the reflected light, and an optical sensor 28 for detecting the strength of the reflected light on the plurality of light receiving surfaces.

The two objective lenses 24, 25 includes a lens 25 having an aperture of "NA=0.85" supporting the blue-violet laser optical disk on one hand, and a lens 24 having an aperture of "NA=0.65" supporting the CDs or DVDs on the other hand. The objective lenses 24, 25 are provided on a movable frame 30 whereof the position can be switched, and when the movable frame 30 is moved in the vertical direction in FIG. 1, the two objective lenses 24, 25 can be switchably disposed at the position of the optical axis of the laser light directed upward by the upright mirror 23. The position switching mechanism is constructed by the movable frame 30 and the structure for switching the position thereof.

Although not shown in the drawings, the objective lenses 24, 25 are mounted to the movable frame 30 via a servo-controlled drive unit so as to be capable of correcting the position in the focusing direction and the tracking direction (corresponds to the radial direction of the optical disk). As regards the servo-controlled drive mechanism, various known technologies may be applied.

The quarter wave plate 22 is configured to displace the phase of the laser light by 45, corresponding to the blue-violet laser of 400 nm in wavelength. When the laser light is passed through the wave plate 22 onward and homeward, the laser light is deflected in the direction in which it can be reflected easily by the beam splitter 19 and hence the amount of the reflected light which passes through the beam splitter 19 and enters the semiconductor laser 12 is reduced and so that the external resonance of the semiconductor laser 12 is prevented from being induced.

The wave plate 22 is fixed to the movable frame 30 via a supporting frame 31, so that the position of the movable frame 30 is changed according to the movement of the movable frame 30. It is configured in such a manner that the wave plate 22 is disposed on the route of the laser light when the objective lens 25 for the blue-violet laser is disposed at the position of the optical axis, while the wave plate 22 is deviated from the route of the laser light when the objective lens 24 for CDs or DVDs is disposed at the position of the optical axis.

In order to avoid incoming of the reflected light for the semiconductor laser 11 which emits the laser light for CDs or DVDs as well, a configuration in which the quarter wave plate supporting the wavelength of the laser light for CDs or DVDs is fixed to the movable frame 30 as in the case of the above-described wave plate 22, so that the wave plate for CDs or DVDs are disposed on the route of the laser light when the objective lens 24 for CDs or DVDs are disposed on the position of the optical axis may be employed. Alternatively, when the wave plate, which is configured to displace the phase by 45, for all the laser light of three wavelengths for CDs, DVDS, and the blue-violet laser (for example, 780 nm, 650 nm, and 400 nm), is used, it can be fixed on the route of the laser light without interlocking with the movable frame 30. The wave plate which supports these three wavelengths may be of a double-type wave plate including, for example, two wave plates adhered to each other.

Figure 3:
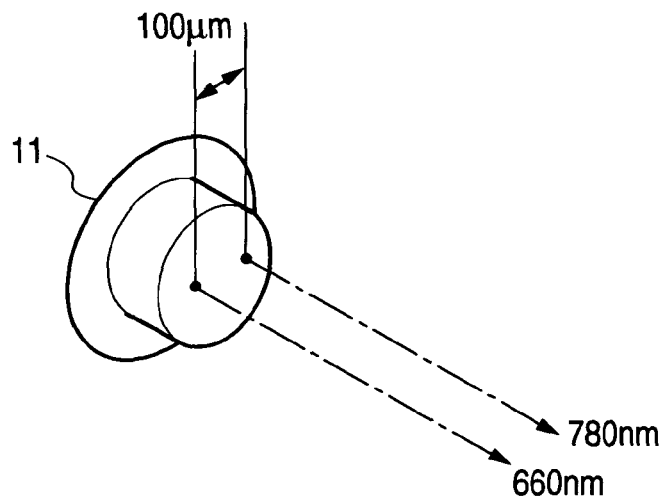
FIG. 3 shows a pattern diagram of a two-wavelength packaged semiconductor laser.

FIG. 3 shows a pattern diagram of the semiconductor laser 11 for emitting laser light for CDs and DVDS.

The two-wavelength packaged semiconductor laser 11 for emitting the laser light of two wavelengths for CDs and DVDs includes a laser diode for emitting the laser light of 650 nm in wavelength and a laser diode for emitting the laser light of 780 nm in wavelengths, the both laser diodes are formed on a single semiconductor substrate and packaged in one unit. A light emitting point of the laser light of 650 nm in wavelength and a light emitting point of the laser light of 780 nm in wavelength are formed so that the gap of about 100 m is generated therebetween.

Figure 4A:
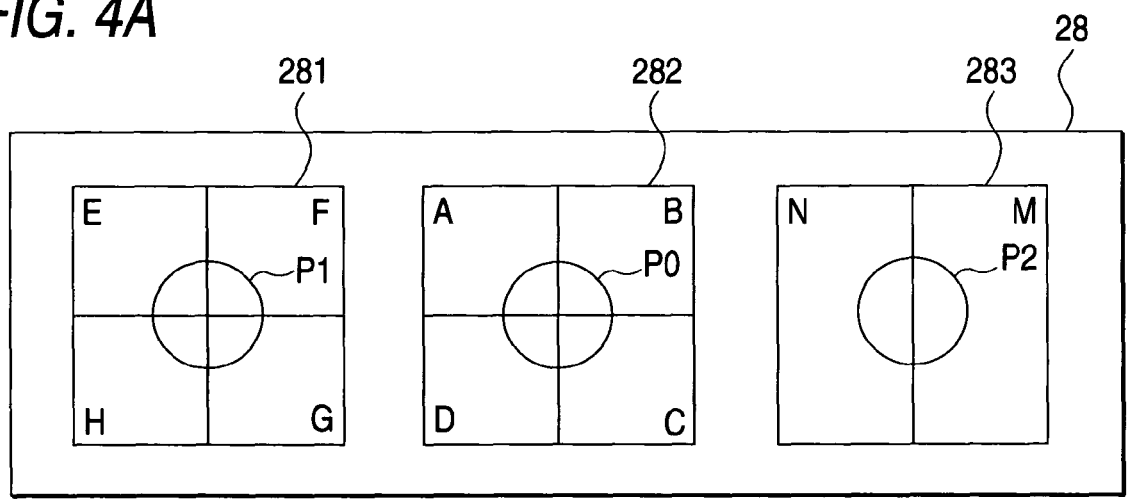
FIGS. 4A and 4B show exemplified structures of a light receiving surface of an optical sensor in FIG. 1.
Figure 4B:
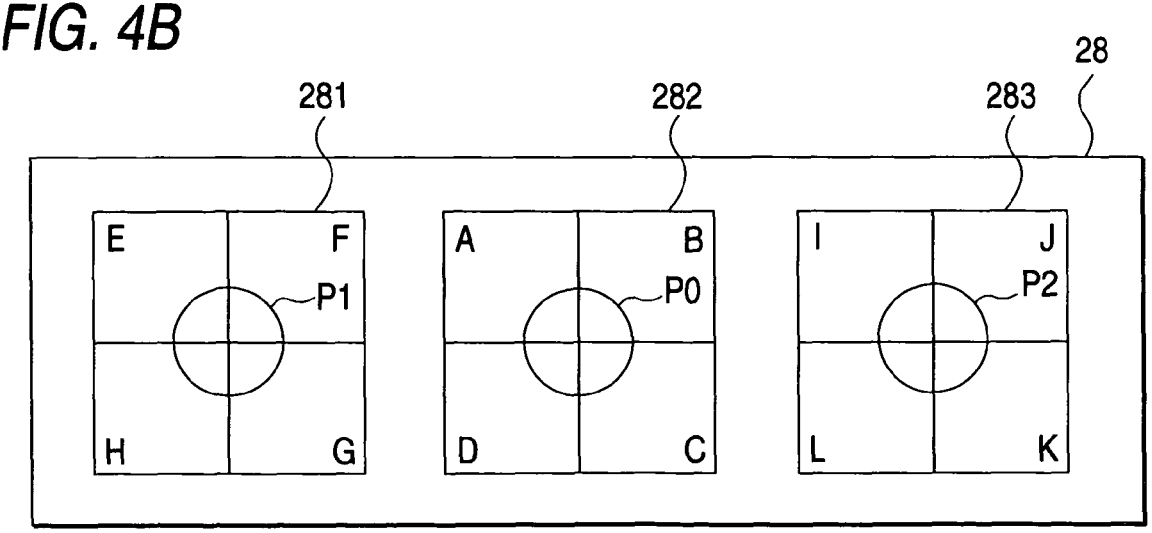

FIGS. 4A and 4B show exemplified structures of a light receiving surface of the optical sensor 28. FIG. 4A is a first example, and FIG. 4B is a second example.

The optical sensor 28 is provided with first to third light receiving surfaces 281-283 in line, as shown in FIG. 4A. The first and second light receiving surfaces 281, 282 are divided into four areas in a matrix manner, and the strength of the laser light can be detected in the respective four divided areas E-G and A-D. The third light receiving surface 283 is divided into two areas, and the strength of the laser light can be detected in the two divided areas N, M.

In the optical system in FIG. 1, the positions of the laser light of 780 nm in wavelength emitted from the semiconductor laser 11 and the laser light of 400 nm emitted from the semiconductor laser 12 are adjusted so that the optical axes of three beams divided respectively in the diffraction gratings 13, 17 are overlapped with each other on the light route on the distal side of the half mirror 18.

In addition, the positions of three beams reflected from the optical disk and entered into the optical sensor 28 are determined so that the main beam at the center and the two sub-beams respectively image light spots P0, P1, P2 at the center of the light receiving surface 282, and at the center of the light receiving surfaces 281, 283 on both sides.

Since the light emitting point of another laser light of 650 nm in wavelength emitted from the semiconductor laser 11 is displaced from the light emitting point of the laser light of 780 nm in wavelength in position, the optical axes of the three beams divided by the diffraction grating 13 are also displaced from the optical axes of the three beams of 780 nm in wavelength in position. However, the amount of displacement in position thereof is set to the same length as the distance between the two adjacent beams out of the three beams by controlling the distance between the light emitting points of the semiconductor laser 11, and the direction of displacement of the position of the optical axes is set to the same direction in which the three beams are aligned.

With such settings, when the laser light of 650 nm in wavelength is reflected from the optical disk and is entered into the optical sensor 28, the main beam at the center is displaced to the next position and enters the light receiving surface 281 on the left side to image the light spot P1 thereon.

Subsequently, a method of generating the focus error signal and the tracking error signal in the optical pickup device as described above will be described below.

In the optical pickup device of the present embodiment, the focus error signals for all these three wavelengths are generated by detecting the main beam on the light receiving surface, which is divided into four areas, using the astigmatic method or the like.

In other words, when using the laser light of 780 nm and 400 nm in wavelengths, the focus signal "(IA+IC)−(IB+ID)" is obtained by the astigmatic method based on the detected amounts IA−ID in the respective divided areas A-D of the second light receiving surface 282.

Alternatively, when the laser light of 650 nm in wavelength is used, the focus error signal "(IE+IG)−(IF+IH)" is obtained by the astigmatic method based on the detected amounts IE−IH in the respective divided areas E-H of the first light receiving surface 281.

Since the astigmatic method, described later, a three-beam method, the differential push-pull method, and a phase difference detecting method are known technologies, detailed description will not be made here.

The tracking error signal is generated by using different methods for the respective wavelengths. When the laser light of 780 nm in wavelength for CDs is used, since high degree of precision is not required so much for the tracking error, it is generated using the three-beam method (also referred to as a three-spot method). In other words, the tracking error signal is obtained by the difference in strength between two sub-beams (E+F+G+H)−(I+J+K+L).

When the laser light of 650 nm in wavelength for DVD is used, the tracking error signal is generated using the phase difference detecting method (DPD method). In the phase difference detecting method, the tracking error signal can be obtained by detecting the main beam on the light receiving surface 281, which is divided into four areas, based on the temporal variations in detected amounts IE−IH of the respective divided areas E-H.

When using the blue-violet laser of 400 nm in wavelength, since the tracking control is performed with a high-degree of precision, the tracking error signal is generated using the differential push-pull method (DPP method). In other words, the tracking error signal "[{(IE+IH)−(IF+IG)}+(IN−IM)]−k{(IA+ID)−(IB+IC)}" can be obtained from the detected amounts IA−ID of the main beam received on four divided areas A-D, and the detected amounts IN, IM of one of the sub-beams received on two divided areas N, M, and the detected amounts (IE+IH), (IF+IG) of another sub-beam received on two divided areas (E+H), (F+G).

Then, the focus error signal and the tracking error signal generated in a manner described above are supplied to a servo-control circuit for the objective lenses 24, 25 and the positions of the objective lenses 24, 25 are displaced, whereby the main beam is irradiated on the data track on the optical disk while being adjusted in position.

As described above, the optical pickup device of the present embodiment can support a plurality of optical disks by switching the three-beam laser light or switching the objective lenses by the single optical pickup device.

By using the two-wavelength packaged semiconductor laser 11, the displacement of the optical axes of the laser light of 650 nm and 780 nm in wavelength is resulted. However, by coordinating the amount of displacement with the distance between two adjacent beams out of the three beams, and by aligning the direction of displacement with the direction of alignment of the three beams, the light receiving surface of the optical sensor can be shared by the three wavelengths, and the focus error signal or the tracking error signal of the respective wavelengths may be generated by the optical sensor having the three light receiving surfaces, which are divided into at least ten areas.

Therefore, by mounting this optical pickup device, the structure of the disk drive device supporting CDs, DVDs, and blue-violet laser optical desks can be simplified and downsized, and hence the cost of the optical sensor in the optical pickup device can be reduced.

The present invention is not limited to the above-described embodiment, and various modifications may be made. For example, although a cylindrical lens 27 is used as a structure for providing astigmatism to the reflected light on the upstream side of the optical sensor, any configuration may be employed as long as the astigmatism is provided in the same manner.

As shown in FIG. 4B, the third light receiving surface 283 of the optical sensor 28 may be divided into four areas. In this case, the same effect as in the case in which it is divided into two areas can be obtained by combining the two divided areas I, L into one area, and combining the two divided areas J, K into one area, respectively.

The configuration of the optical system which guides the laser light from the semiconductor laser to the objective lenses may be varied without departing the scope of the invention.

As described above, according to the present invention, since the single optical pickup can support the plurality of types of optical disks, when it is mounted to the disk drive which supports the plurality of types of optical disks, the configuration of the disk drive may be simplified and downsized.

In the respective cases of the laser light of three wavelengths, the tracking error signals which corresponds to the respective wavelengths can be generated using the optical sensor having three light receiving surfaces divided into at least ten areas by sharing the light receiving surface of the optical sensor, and hence the cost reduction of the optical element is advantageously achieved.

What is claimed is:

1. An optical pickup device operable to perform recording or reproduction of information with respect to a plurality of types of optical disks by irradiating either one of three types of laser light having different wavelengths on a recording surface of the optical disk, the optical pickup device comprising:
   a first laser emitter operable to emit a first laser light having a first wavelength;
   a second laser emitter operable to emit a second laser light having a second wavelength and a third laser light having a third wavelength, the second wavelength being longer than the first wavelength, the third wavelength being longer than the second wavelength;
   a first diffraction grating configured to divide the first laser light into at least three first light beams;
   a second diffraction grating configured to respectively divide the second laser light and the third laser light into at least three second light beams and at least three third light beams; and
   an optical sensor comprising a first light receiving surface divided into four areas, a second light receiving surface divided into four areas, and a third light receiving surface divided into at least two areas, wherein:
   the optical sensor is so configured that the first light beams reflected from the optical disk reach the first light receiving surface, the second light receiving surface and the third receiving surface, respectively;
   the optical sensor is so configured that none of the second light beams reflected from the optical disk reaches the third light receiving surface; and
   the optical sensor is so configured that the third laser light beams reach the first light receiving surface, the second light receiving surface and the third light receiving surface, respectively.

* * * * *